(12) United States Patent
Cope

(10) Patent No.: US 6,336,608 B1
(45) Date of Patent: Jan. 8, 2002

(54) FLEXIBLE WEB ROLLER GUIDE ASSEMBLY WITH AN INTEGRAL CENTRIFUGAL PUMP CAPABILITY TO PROVIDE A HYDROSTATIC AIR BEARING FUNCTION TO THE ROLLER GUIDES OUTSIDE SUPPORTING SURFACE

(76) Inventor: James Robert Cope, 4304 County Road 31, Logan County, CO (US) 80722

( * ) Notice: Subject to any disclaimer, the term of this patent is extended or adjusted under 35 U.S.C. 154(b) by 0 days.

(21) Appl. No.: 09/515,926

(22) Filed: Feb. 29, 2000

(51) Int. Cl.[7] .......................... B65H 23/32; B65H 57/14
(52) U.S. Cl. ................ 242/615.12; 226/97.1; 242/615.2
(58) Field of Search .......................... 242/615.12, 615.2, 242/615.11; 226/97.1

(56) References Cited

U.S. PATENT DOCUMENTS

| | | |
|---|---|---|
| 1,430,752 A | 10/1922 | Plaisted |
| 1,849,337 A | 3/1932 | Spracher et al. |
| 1,865,842 A | 7/1932 | Davidson |
| 2,241,946 A | 5/1941 | Edstrom |
| 2,523,847 A | 9/1950 | Russey |

(List continued on next page.)

OTHER PUBLICATIONS

Book, 1987, *Chaos* by James Gleick, pp. 121–123.

*Primary Examiner*—Michael R. Mansen

(57) ABSTRACT

A combination flexible web roller guide assembly and an integral centrifugal pump (fan) functional device located inside the roller's outer surface where an air bearing flexible web support Hydrostatic air film is created upon the roller guide's exterior circular surface. The air bearing film is created when a web is mounted onto the roller's exterior surface with web tension applied and the roller's Outer Tube is rotated by some external means. This results in a web support device that possesses the advantages of roller guides AND air bearings, and none of their disadvantages. A highly reliable mechanical device is obtained simply by the incorporation of centrifugal fan-like vanes and an air path from the atmospheric exterior, to inside the outer tube of the roller into spaces between the vanes, and finally through multiple air ports located on the roller's outer tube surface. Air is pumped with Centrifugal Forces generated by the Roller-Air Pump device being rotated by any external means.

1 Claim, 18 Drawing Sheets

U.S. PATENT DOCUMENTS

| | | | |
|---|---|---|---|
| 2,929,572 A | 3/1960 | Baumgartner et al. | |
| 2,962,200 A | 11/1960 | Pouliart et al. | |
| 2,976,749 A | 3/1961 | Albedyhl | |
| 3,031,119 A | 4/1962 | Allen et al. | |
| 3,050,351 A | 8/1962 | Kempf | |
| 3,078,022 A | 2/1963 | Durbeck et al. | |
| 3,087,664 A | 4/1963 | Streeter | |
| 3,110,431 A | 11/1963 | Potter et al. | |
| 3,122,295 A | 2/1964 | Davison et al. | |
| 3,134,527 A | 5/1964 | Willis | |
| 3,151,796 A | 10/1964 | Lipschutz | |
| 3,156,398 A | 11/1964 | Lauxen et al. | |
| 3,161,120 A | 12/1964 | Timares et al. | |
| 3,187,588 A | 6/1965 | Parker | |
| 3,189,240 A | * 6/1965 | Emslie | 242/615.12 X |
| 3,194,611 A | 7/1965 | Mahony | |
| 3,199,800 A | 8/1965 | Reader | |
| 3,201,985 A | 8/1965 | Williams | |
| 3,219,990 A | 11/1965 | Goehle | |
| 3,270,932 A | 9/1966 | Smith, Jr. | |
| 3,270,933 A | 9/1966 | Dekker | |
| 3,290,795 A | * 12/1966 | Jarreby | 242/615.12 X |
| 3,327,916 A | 6/1967 | Weidenhammer et al. | |
| 3,347,437 A | 10/1967 | Rush | |
| 3,418,434 A | 12/1968 | Groenewegen | |
| 3,420,424 A | 1/1969 | Barbeau et al. | |
| 3,422,411 A | 1/1969 | Smith | |
| 3,505,716 A | 4/1970 | Moser | |
| 3,567,093 A | 3/1971 | Johnson | |
| 3,577,788 A | 5/1971 | Tischer | |
| 3,587,961 A | 6/1971 | Ritter | |
| 3,600,046 A | 8/1971 | Redmon | |
| 3,602,412 A | 8/1971 | Altonji | |
| 3,620,430 A | 11/1971 | Baumann et al. | |
| 3,674,325 A | 7/1972 | Morony et al. | |
| 3,678,216 A | 7/1972 | Rousso, Jr. et al. | |
| 3,688,956 A | 9/1972 | Kjos | |
| 3,761,002 A | 9/1973 | Baumann et al. | |
| 3,774,829 A | * 11/1973 | Francia | 226/97.1 |
| 3,797,961 A | 3/1974 | Brechbuhl | |
| 3,824,831 A | 7/1974 | Bock | |
| 3,837,553 A | 9/1974 | Bock | |
| 3,837,715 A | 9/1974 | Bock | |
| 3,984,039 A | 10/1976 | Hawley et al. | |
| 4,124,156 A | * 11/1978 | Waffner | 242/615.12 X |
| 4,337,885 A | 7/1982 | Stahler | |
| 4,447,770 A | 5/1984 | Shepherd | |
| 4,474,320 A | 10/1984 | Rueger | |
| 4,484,860 A | 11/1984 | Brenholt et al. | |
| 4,525,757 A | * 6/1985 | Imanishi et al. | 242/615.12 X |
| 4,565,495 A | 1/1986 | MacLeod, Jr. | |
| 4,573,810 A | 3/1986 | Fust et al. | |
| 4,602,873 A | 7/1986 | Izumi et al. | |
| 4,641,214 A | * 2/1987 | Imanishi et al. | 242/615.12 X |
| 4,747,705 A | 5/1988 | Agrawal | |
| 4,797,009 A | 1/1989 | Yamazaki | |
| 4,834,559 A | 5/1989 | Kalvoda | |
| 5,141,338 A | 8/1992 | Asada et al. | |
| 5,188,272 A | 2/1993 | Kanbe et al. | |
| 5,328,270 A | 7/1994 | Crawford et al. | |
| 5,413,416 A | 5/1995 | Grunze et al. | |
| 5,501,386 A | 3/1996 | Kobayashi | |
| 5,582,483 A | 12/1996 | Grunze et al. | |
| 5,593,230 A | 1/1997 | Tempest et al. | |
| 5,909,966 A | 6/1999 | Suzuki et al. | |
| 5,944,427 A | 8/1999 | Murabe et al. | |
| 5,997,180 A | 12/1999 | Ishizuka et al. | |

\* cited by examiner

FLEXIBLE WEB ROLLER GUIDE ASSEMBLY WITH AN INTEGRAL CENTRIFUGAL PUMP CAPABILITY TO PROVIDE A HYDROSTATIC AIR BEARING FUNCTION TO THE ROLLER GUIDES OUTSIDE SUPPORTING SURFACE

BACKGROUND—CROSS REFERENCE TO RELATED APPLICATIONS (Not Applicable)

1. Background Field of Invention

This invention applies to the computer magnetic tape data recorder product industry and more specifically to the development of the mechanical tape (media) path portion of the product. However it can be applied to any industry that rolls webs of any width onto reels for further processing or storage purposes.

2. Background Prior Art

A search of the U.S. Patent Office Patent Records does not reveal a Roller Guide Assembly of any design that incorporates an integral Centrifugal Air Pump within it's basic outline. The Durbeck U.S. Pat. No. 3,078,022, entitled FLUID BEARING, which was issued in 1960 was the only patent found that utilized a rotating pump to generate air flow to an Hydrostatic air bearing assembly. Looking at FIG. 1-PRIOR ART one can see the use of a Reaction Air Pump in this patent to push air into the air bearing insides. This patent teaches the problem with air bearings that uncovering ports that feed the air film generated can affect the operation of the bearing supporting a film. It teaches the use of a vane-like wall that does not rotate with the pump itself. But rather it is selectively positioned to cover the air bearing ports that may be uncovered depending upon the wrap angle of the media. The wrap can change when media is transferred from reel to reel during the data recording or reproducing process. The outside air bearing surface does not rotate. The wall position is controlled by a separate mechanism to set it where desired. It is believed that this pump design will not easily push air into the air bearing because of long, narrow air passages shown in FIG. 1. It is a very complicated design and there would be problems placing the design into any medium, or smaller sized, magnetic tape recorder. It is not obvious how to conceive of the Present Invention (described herein) based upon the Durbeck patent.

The only other patent that touches upon the Present Invention is the DAVISON et al U.S. Pat. No. 3,122,295, entitled WEB TRANSPORT, issued in 1964. The Davison Patent teaches driving 2 rotating capstans continuously using a single motor, belt and pulleys; in both CW and CCW directions at the same time. The function of the magnetic tape unit that uses this system is to allow the capstans to spin up to speed and hold this speed for the duration. Then a brake between the capstans is applied fully at all times. To start the media in either direction an external air pressure source is engaged to push down upon the media being supported by a Hydrodynamic Air Film generated by the spinning wheels. The two Capstan's outer surfaces that the air film is generated upon have ports and exterior grooves. There are also a ring of sub-tunnels leading from these ports to the atmosphere at the sides of the wheels. The Patent states that the air film is allowed to collapse when the overhead air pressure is applied so the friction would cause the media and the capstan of choice to move together. No vacuum or pressure head is generated inside these capstan wheels. It teaches that the ports on the Capstan surface are exposed to atmospheric pressure through the surface grooves that intercept the ports, down through the crossholes to the side. It teaches the fact that Hydrodynamic air film can be generated on a moving roller shaped surface but can be easily deflated by a design described in the Davison Patent. It does very effectively teach the use of an external motor and belt system to continuously rotate the subject wheels continuously. It does not teach the generation of Hydrostatic Air Films.

There are many examples in the U.S. Patent Record that teach both Hydrodynamic Air Film effects and Hydrostatic Air Film effect, but not at the same time. It may be possible that the Davison Patent does generate some Hydrostatic Air Film while rotating but it is not obvious. There is no effort to make the internal holes large enough or the internal spaces large enough so air could easily flow from the sides to the surface ports. The surface grooves would destroy any Hydrostatic Air Film with the bleeding off the pressure that may be generated. In fact it is hard to understand how even a Hydrodynamic Air Film could be generated with this invention.

A discussion of the difference relative to Magnetic Tape Unit design of Hydrodynamic and Hydrostatic pressures is presented here as an aid to understand the Prior Art better. Hydrodynamic Guides are very smooth guiding surfaces with very small wrap angles of the media entering and exiting the guide. They self generate an air film by pulling air into the space between the media supported over the guide and the guide exterior surface. The Hydrodynamic Principle applies to both when the guide is fixed, or if it rotates as in a roller design. The pressure is positive for a time before exiting the guide and at the trailing end it goes negative for a short time before the media leaves the surface. This is shown in FIG. 6-PRIOR ART. This figure shows a Hydrodynamic Guide supporting media traveling (V) across the top surface. Below, in FIG. 9 is a plot of the pressure developed in the interface between the media and guide surface. One can see the vacuum being generated at the left side due the conservation of energy that takes place during this operation. This vaccum causes contact between the media and roller surface. Note that the Pressure Area A1 Equals A2. The pressure head (P) generated with this kind of guide is a direct function of speed of the media (V), tension of media moving across (T), radius of the guide (R), and the wrap angle (W) of the media being stretched over the guide's top surface. An important aspect of using a Hydrodynamic Guide is to insure that the Wrap Angle is not too high. This would lead to stiction in high humidity conditions for the recorder and would produce operational errors for the machine. Also very small wrap angles will just fly the media over the guide surface without making contact. This might be preferable in tape unit design but probably not possible due to space limitations where the media must leave a reel and be wound up onto another reel in a very small space.

Hydrodynamic Guides are beneficial because of:

1) the Recorder Design can make severe direction changes when placing the tape path design into a small volume,
2) have been lower cost (up to this Invention) to use in low cost Tape Recorders, and
3) are simple in design and higher in reliability than air bearings (again up to this Invention).

A Hydrostatic Air Film is created when external pressure is applied to the insides of a guide with a number of small ports allowing the pressurized air to bleed to the top surface. If there were media with tension placed upon this surface then the bleeding air would be trapped and would develop a pressure. The U.S. Patent Record has numerous examples of Air Bearing design and improvements over the past 30 years, and it is a common, well know phenomena. The actual pressure generated in the space between the media and the guide outer surface is a direct function of the:

1) external supply pressure head,
2) the amount of air flow through the bearing ports due to leakage,
3) the tension applied to the media,
4) the wrap angle of the media,
5) are there any uncovered air bleed ports?, and
6) the amount of side leakage at the media edges.

In a Magnetic Tape Recorder it is preferable to use Hydrostatic Air Bearings as they allow:

1) little, or no, friction in the tape path,
2) do not engage the inertia properties of rollers that lead to tension spikes with starting and stopping the media,
3) do not have problems with any environmental conditions that would tend to produce humidity generated friction buildup between media and guide surfaces, and
4) will result in low power consumption for the entire recorder. Continuing with the Prior Art found in the U.S. Patent Record STAHLER's U.S. Pat. No. 4,337,885, entitled APPARATUS FOR GUIDING TAPE, and issued in 1982, is shown in FIG. 3 PRIOR ART. It teaches how one would guide the recording media for improved Track Density across the media width by incorporating a slight Taper shown as the angle 'X' in the FIG. 3. This possible guide system was never a viable design possibility for a Tape Recorder using a number of Rollers in the Tape Path layout. This is because of the Roller running with the moving media would make contact with the media and a significant frictional force could be present. It is impractical to guide against this frictional force as the guide forces would have to be large enough to overcome. The wrap angle and Tension applied to the media on the Roller itself provides a normal force that this frictional force results. This would lead directly to high edge forces and stresses on the media edges during operation. The result is edge damage and possible lost of data. As can be seen with the Stahler Patent, it is using a Hydrostatic Air Bearing to support the media. Very little force would be required to push the media so it would register against a valid guide surface as shown in FIG. 3. The Present Invention would allow a tapered surface to be used to guide the media towards a Reference Surface for increased Track Densities. This would negate slitting tolerances of the media and bearing Non-Repeatable Runout tolerances.

As was stated earlier in this section there was no instance in the U.S. Patent Record of a Roller using the principles of Centrifugal Force to generate a Hydrostatic air film. The best example of a straight-forward look at how a Centrifugal Fan operates is shown in FIG. 4 PRIOR ART. MacLeod's U.S. Pat. No. 4,565,495, entitled ARMORING SYSTEM FOR AN AIRFOIL CENTRIFUGAL FAN, issued in 1986, shows how the air flows through a device incorporating Vanes. The FIG. 4 shows the Input Airflow (Gi) migrating through the unit and exiting at a angle normal to the centerline of the fan with Output Airflow (Go). The Vanes are an important aspect and essentially the fan would not perform well without them. Also the Inlet Shroud shown keeps the air directed so there is no appreciable leakage anywhere. This is important in order to generate sufficient pressure head with the flow. FIG. 7-PRIOR ART depicts a Pressure-Flow Curve for a typical Centrifugal Fan operating at a fixed speed. Note that when the Flow (Q) is reduced to near zero, then the Pressure (P) is at it's maximum possible value. This tendency would apply to the Present Invention also. The Pressure Head inside the Roller and Integrated Pump would also be near it's maximum due to media being held tight across most of the holes. Also note that the relationship indicated by the line plotted in FIG. 7 shows the relationship between Pressure and Flow is Non-Linear. This is due to the fact that the cross-sectional shape of the vanes that turn the air outwards do influence how efficiently it can be done with any fixed speed. This Non-linear relationship is the key to designing an efficient fan. Consequently the air-flow performance that is obtained on the Present Invention can be influenced greatly by the shape of the Walls (Vanes) cross-sections located on the inside surface of the Outer Tube of the Roller Assembly.

The exact path and pressure profile that an air flow device would follow cannot be analyzed and determined before actually building the device and testing it. Reference is made to the classic book titled, CHAOS, by James Gleick published in 1987 where the author discusses the inability of scientists to forecast the nature of fluids. More specifically his remarks on pages 121 through 123 where he describes how difficult forecasting the performance of an aircraft wing, and further discussions about 'eddy' currents in fluids that impact the final flow performance of any device using fluids. The development of air bearings has been mainly through building parts and testing them for performance. FIG. 8 PRIOR ART shows a typical example of a U.S. Patent (FIG. 1 of HAWLEY et al U.S. Pat. No. 3,984,039 issued in 1976) on the subject of Hydrostatic Air Bearings. It is representative of all the Air Bearing Patents that can be found in the Patent Record. None were found where the outer air bearing surface with the bleed ports on the surface were found that also rotated about it's projected centerline based upon the radius selected for the bearing. The Davison Patent (discussed earlier) was the closest by spinning Hydrodynamic Capstan Wheels.

There are a number of Patents in the U.S. Record that show that the flow of lubrication, whether it is gas or fluid, can be influenced by the shape of the internal walls and structure. FIG. 5-PRIOR ART shows AGRAWAL's U.S. Pat. No. 4,747,705, entitled POWER SHAPED MULTIPAD HYDRODYNAMIC JOURNAL BEARING, issued in 1988, where a complex shape is incorporated within the internal structure of a Bearing. There are others also and they are listed below. However it is not seen that these Patents teach the uniqueness of the Present Invention is any manner even though they teach the ability to enhance gas or fluid flows with Geometric shapes. The other patents found are:

| Inventor: Title: | U.S. Pat. No. : | Issue Date: |
|---|---|---|
| Izumi | 4,602,873 | Jul 29, 1986 |
| 'Vibration-Controlling Bearing' | | |
| Kalvoda | 4,834,559 | May 30, 1989 |
| 'Multiple Face Radial Plain Bearing' | | |
| Grunze | 5,413,416 | May 9, 1995 |
| 'Roller Guide Member for Full Complement Roller Bearing' | | |
| Grunze | 5,582,483 | Dec 10, 1996 |
| 'Roller Guide Member for Full Complement Roller Bearing' | | |
| Tempest et al | 5,593,230 | Jan 14, 1997 |
| 'Air Bearing' | | |
| Suzuki | 5,909,966 | Jun 8, 1999 |

-continued

| Inventor: | | |
|---|---|---|
| Title: | U.S. Pat. No. : | Issue Date: |
| 'Self Acting Air Bearing' | | |
| Murabe et al | 5,944,427 | Aug 31, 1999 |
| 'Dynamic Pressure Gas Bearing Structure and Method. . .' | | |
| Ishizuka et al | 5,997,180 | Dec 7, 1999 |
| 'Circumferential Flow Type Dynamic Pressure Bearing' | | |

All of the above referenced Patents have unique Geometric features for various types of bearings, however they do not teach the fundamentals put forward by the Present Invention.

OBJECTS AND ADVANTAGES

Today's magnetic tape data recorder product demands much lower costs and better reliability than earlier tape products. Also the Form Factor (the overall size of the product's shape and size) enters into the market equation as 'smaller is better' due to the reduction in space needed for computers of all models and cost targets. Today's developers must use only roller guides to meet these demands. Hydrostatic air bearings require cost and space to be incorporated into small Form Factor tape units. And Hydrodynamic air bearings have unique problems also. Rollers work well in small spaces except as recording parameters such as Track Density (Tracks per Inch across the width of tape) go up for increased tape cartridge or tape reel data capacities, they do not lend themselves for accurate guiding. Also the roller introduces some new tension control aspects not seen before with increases in Recording Linear Densities (Flux Reversals per Inch along the length of tape). Increased capacity of the unit of media (either cartridge or reel) for a family of magnetic tape products is the single biggest aspect from a mechanical development viewpoint. Utilizing air bearings in a tape path add costs and complexity, however air bearings are a better component for controlling media guiding and tension control. The Roller-Air Pump concept discussed in this Specification provides the advantages of both the roller and the air bearing but not their weaknesses.

DRAWING FIGURES

FIG. 1 shows Prior Art of a Reaction Pump used with an Air Bearing Assembly from U.S. Pat. No. 3,078,022.

FIG. 2 shows Prior Art of a Dual Spinning Capstan Drive System used on a Magnetic Tape Unit from U.S. Pat. No. 3,122,295.

FIG. 3 shows Prior Art of an Inclined Air Bearing Assembly used to guide Magnetic Media from U.S. Pat. No. 4,337,885.

FIG. 4 shows Prior Art of a typical Centrifugal Fan Assembly from U.S. Pat. No. 4,565,495.

FIG. 5 shows Prior Art of a Hydrodynamic Roller Assembly where the outside structure has shape and contour from U.S. Pat. No. 4,747,705.

Figure 8:
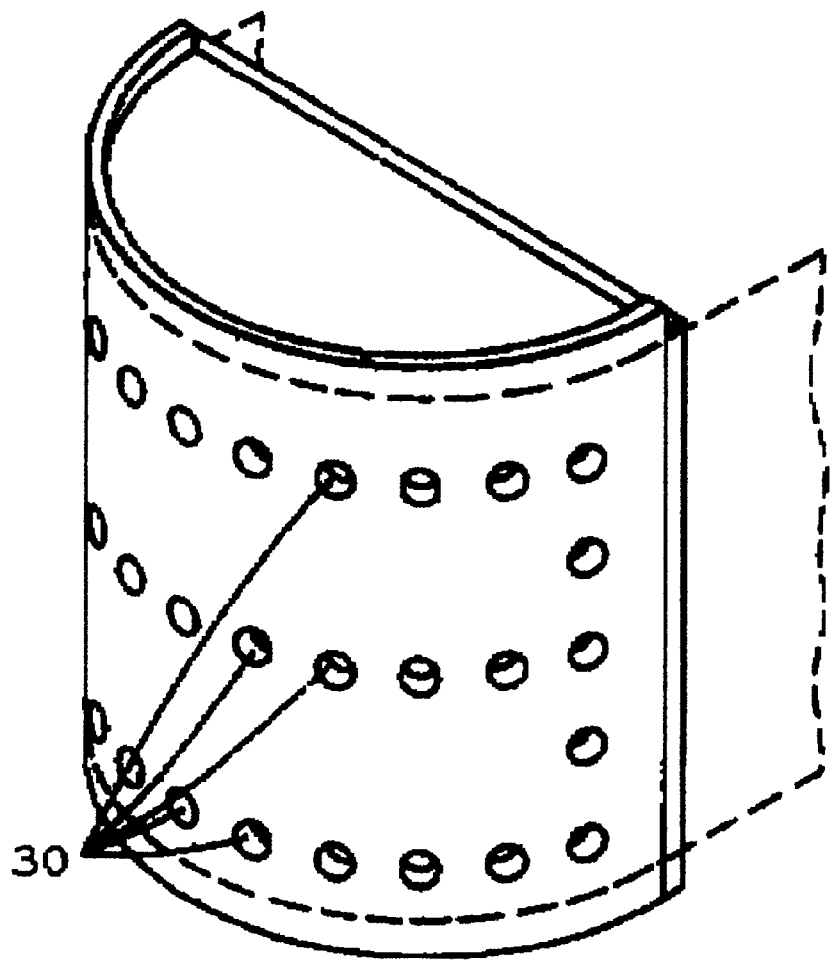

FIG. 8 shows PRIOR ART of a Typical Air Bearing from U.S. Pat. No. 3,984,039.

Figure 6:
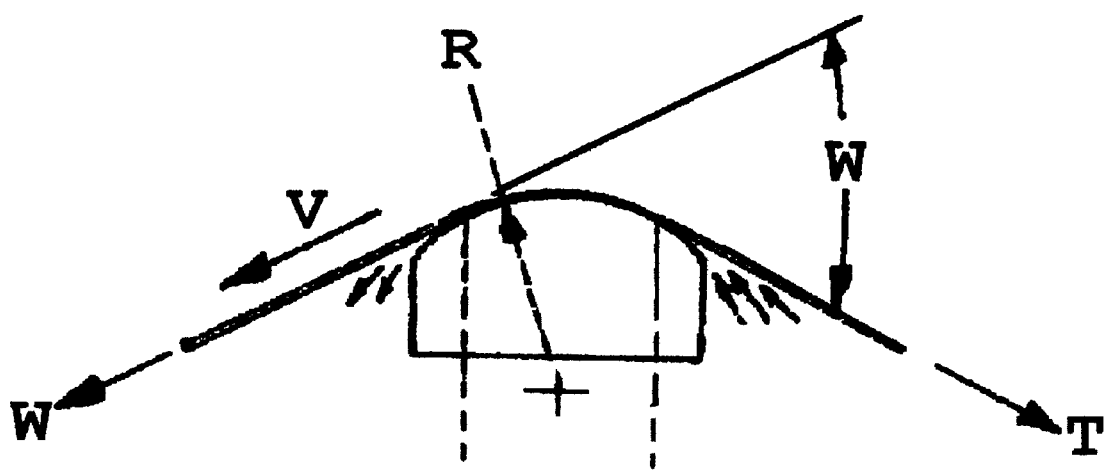
FIG. 6 shows Prior Art of How a Hydrodynamic Guide operates.
Figure 9:
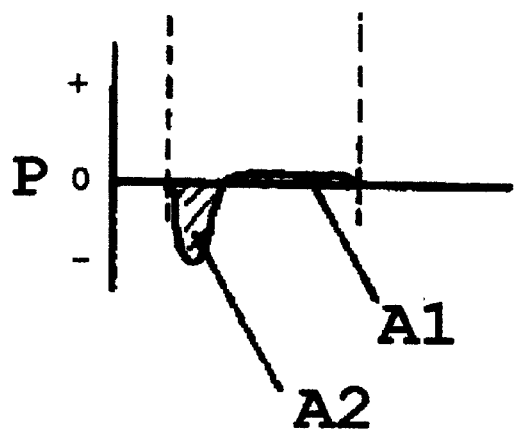
Figure 7:
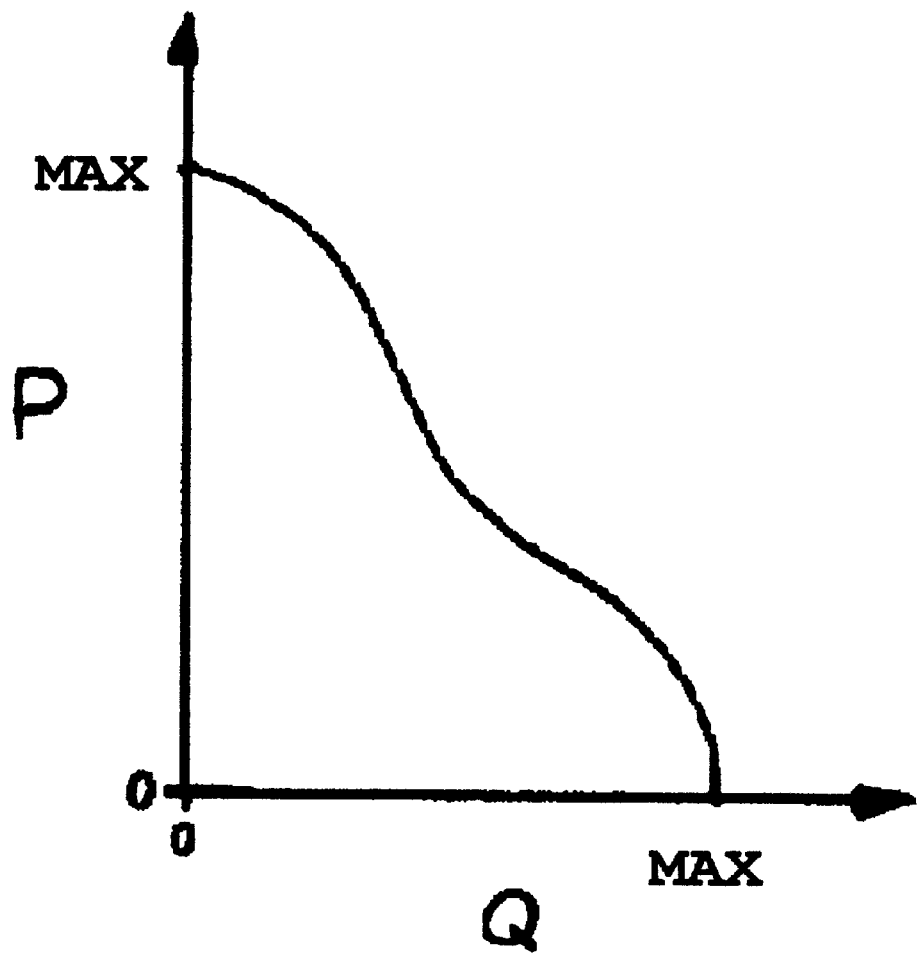
FIG. 7 shows Prior Art of a Typical Pressure-Flow Curve for a Centrifugal Fan.

FIG. 9 is a plot of the pressure developed in the interface between the media and the guide surface shown in FIG. 6.

Figure 10:
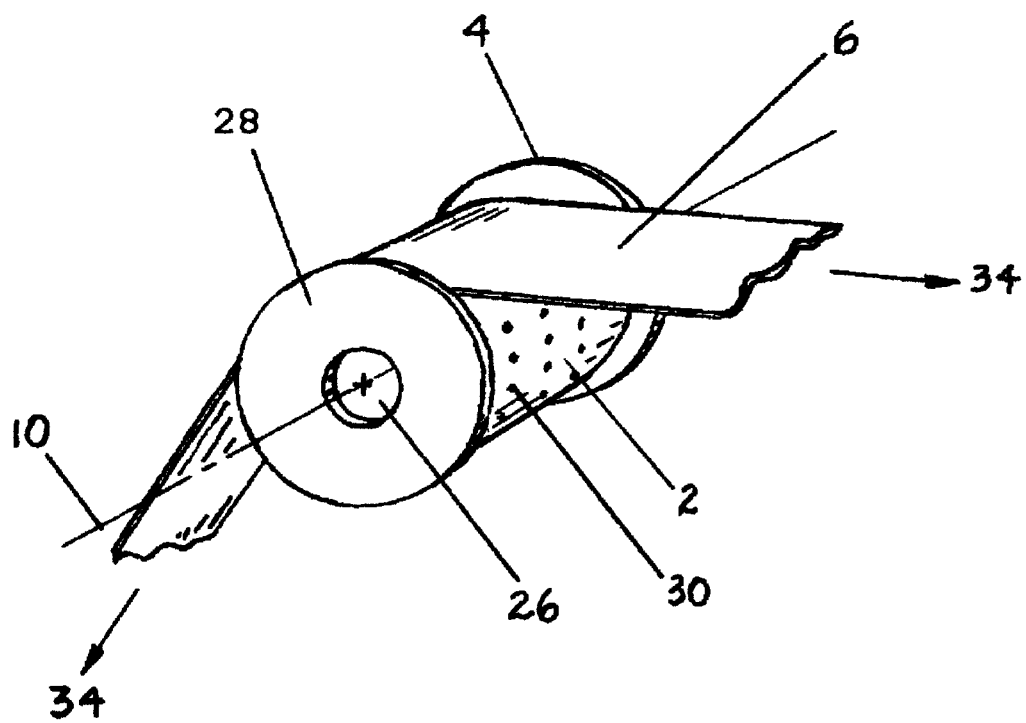

FIG. 10 shows the Present Invention Roller Guide with Integrated Air Pump supporting Magnetic Media under tension.

Figure 11:
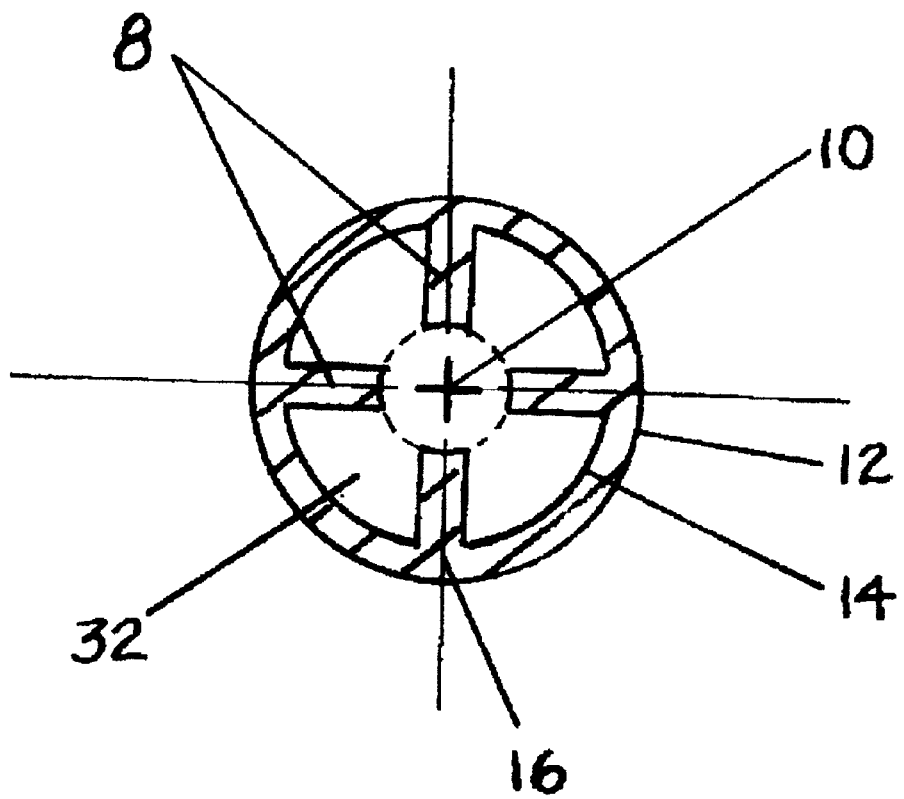

FIG. 11 shows an End View of the Present Invention Roller Outer Shell with Centrifugal Vanes attached inside.

Figure 12:
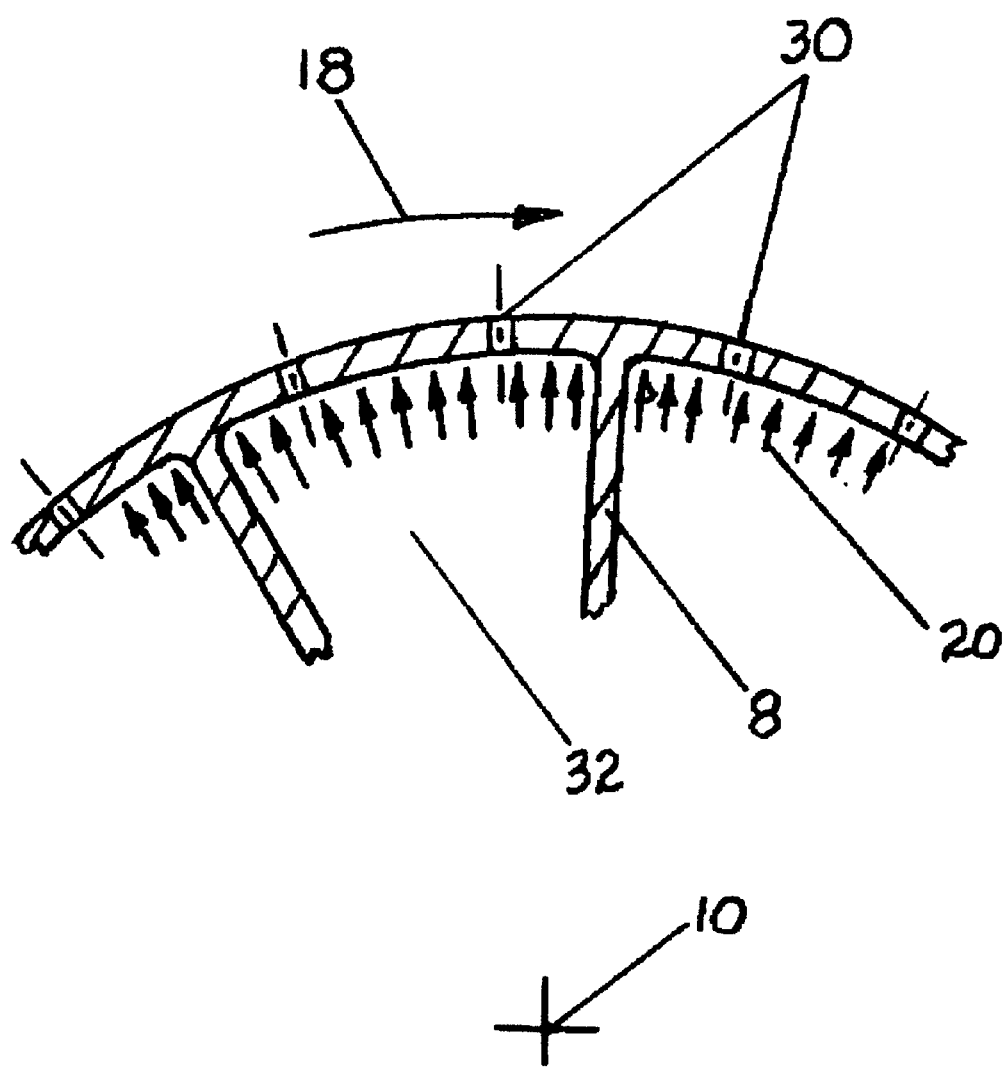

FIG. 12 shows an End View Section of the Present Invention Pressure Head that is created from the Centrifugal Force generated by rotation of the assembly.

Figure 13:
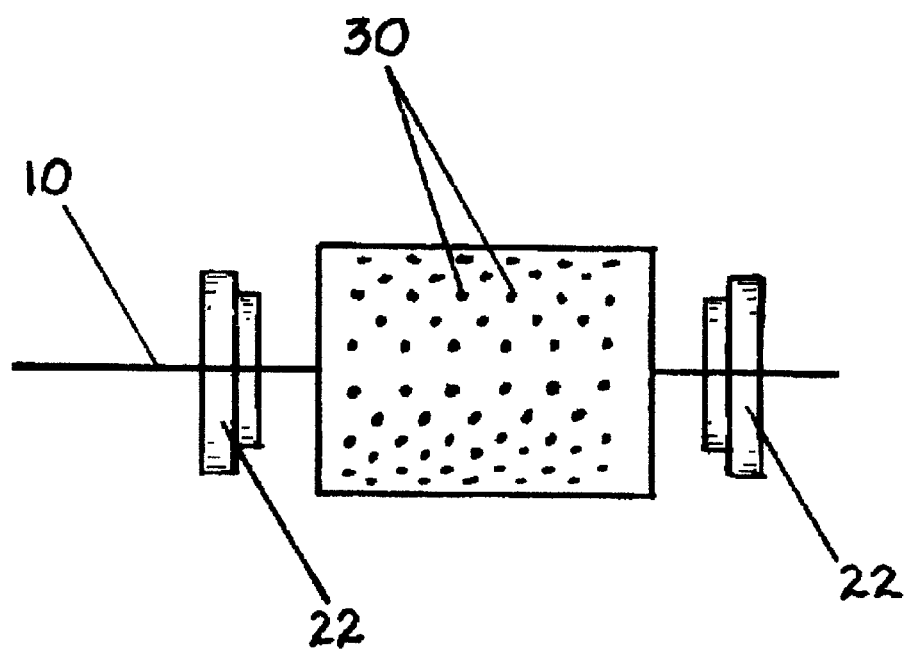

FIG. 13 shows the Present Invention with two End Supporting Rotation Means (ie bearings) exploded view with Outer Tube of the roller guide assembly.

Figure 14:
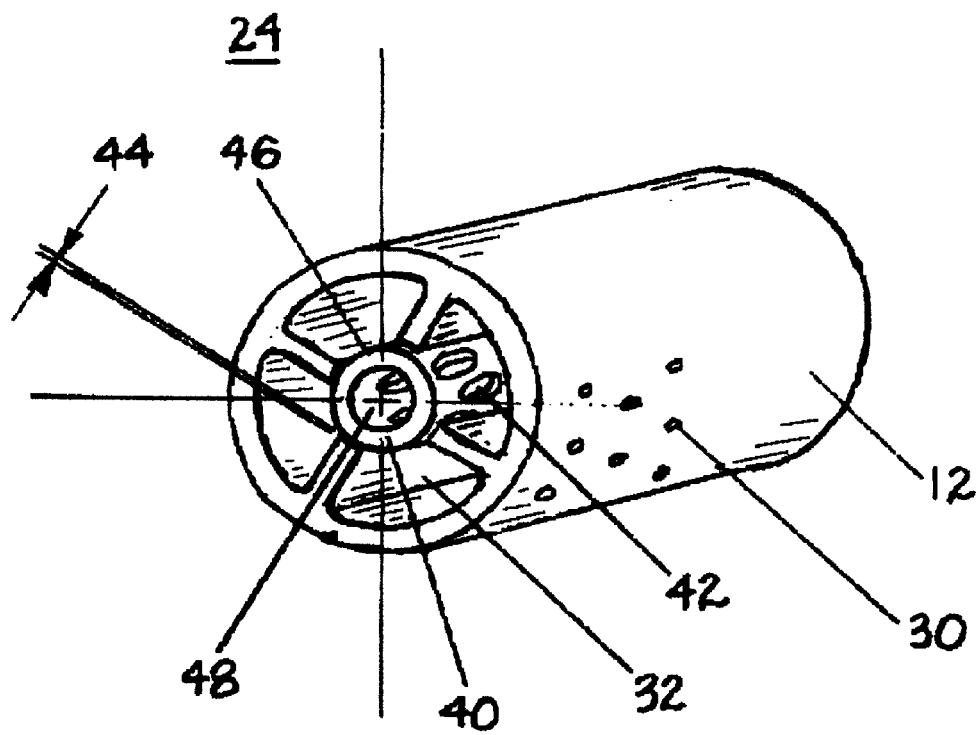

FIG. 14 shows an Isometric View of the Present Invention with the optional Inner Tube Piece for better air flow through the assembly.

Figure 15A:
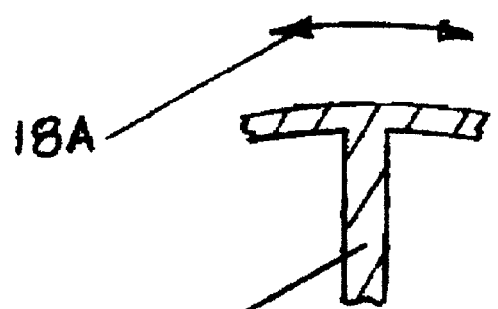
Figure 15B:
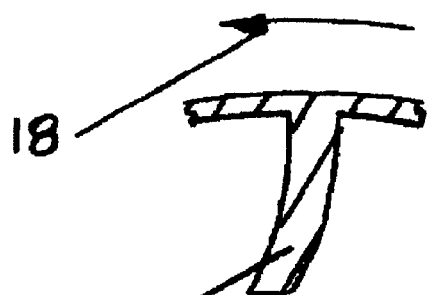
Figure 15C:
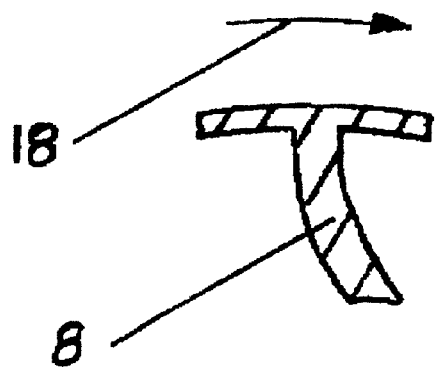

FIGS. 15A, 15B and 15C show the End View Section Views of the Present Invention with three cross-sectional shapes that the internal walls (vanes) can have for enhanced, directional air flow through the Centrifugal Air Pump.

Figure 16:
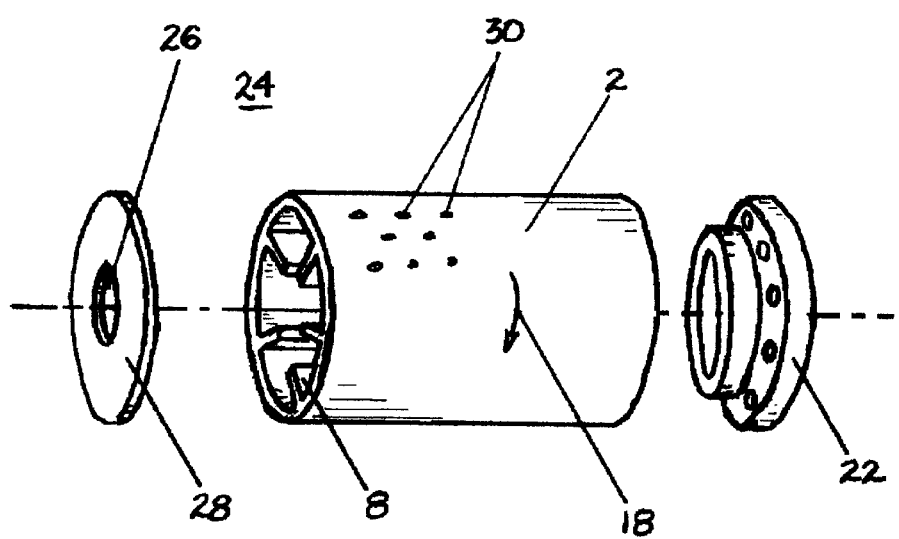

FIG. 16 shows the Present Invention in an exploded view with only one Rotational, Support Means, and the Air Inlet piece.

Figure 17:
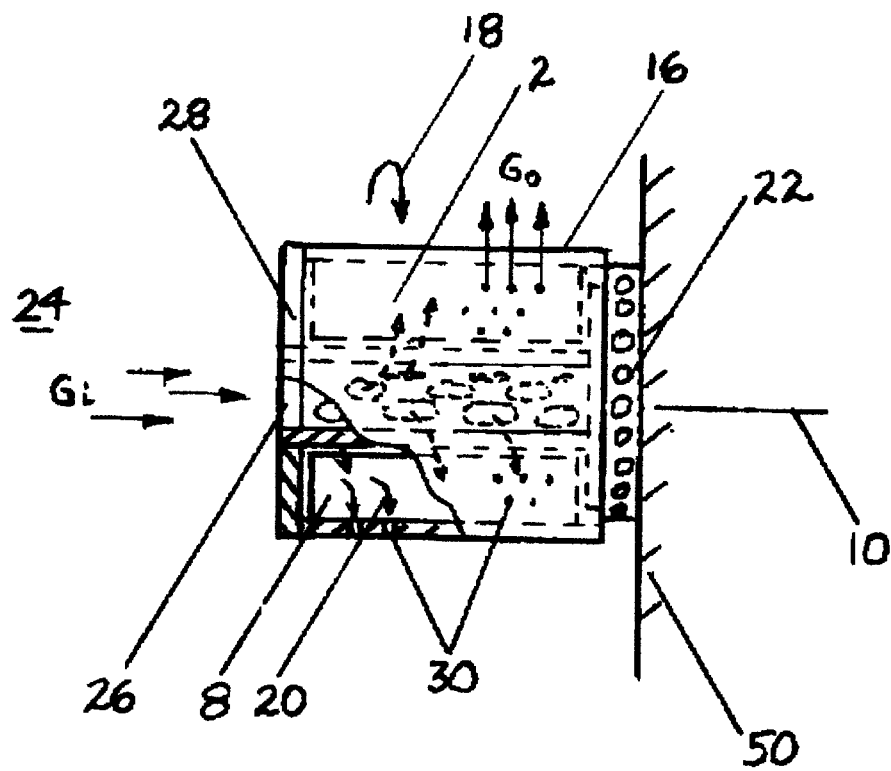

FIG. 17 shows the Present Invention's Airflow Path through the Roller Assembly.

Figure 18:
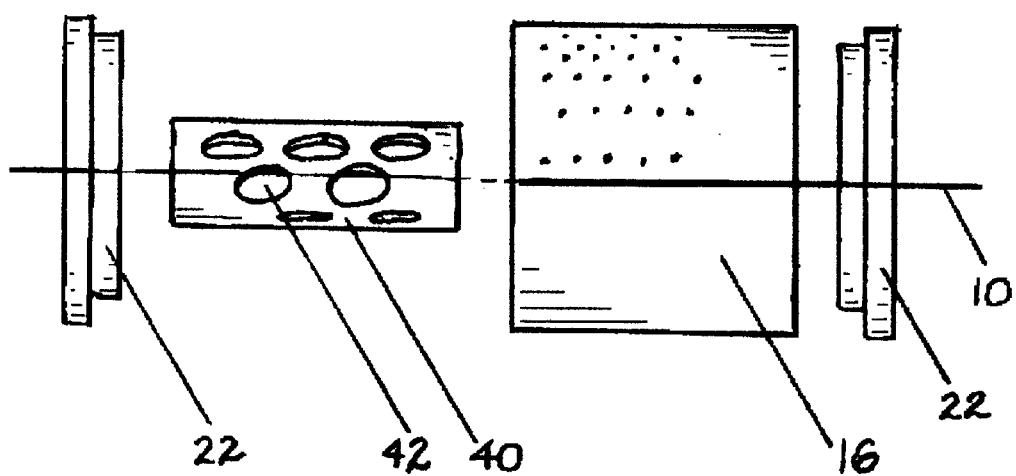

FIG. 18 shows the Present Invention with an exploded view of the Roller Assembly with two End Rotating Support Means (bearings) and the Inner Tube for enhanced air flow.

Figure 19:
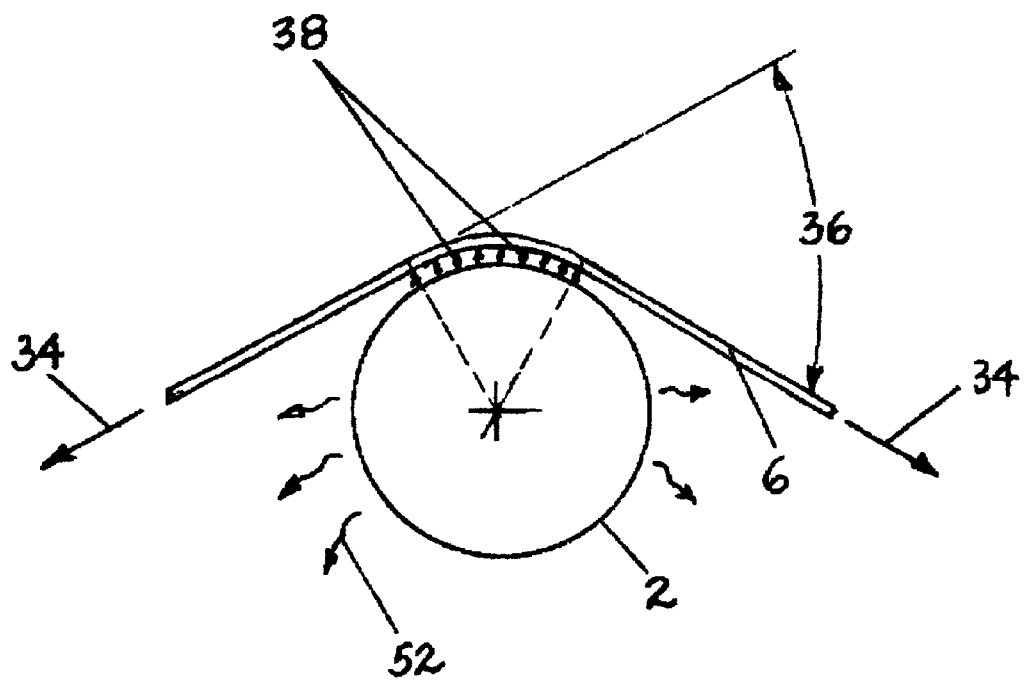

FIG. 19 shows the Hydrostatic Air Film developed by the Present Invention.

LIST OF REFERENCE NUMERALS

2—Roller Guide
4—Edge Flange guide
6—Thin Shell Flexible Web
8—Wall (Vane)
10—Rotational Centerline
12—Roller Outer Diameter Surface
14—Roller Inside Diameter Surface
16—Roller Outer Tube (Shell)
18—Rotation of Roller Outer Tube
18A—Rotation in Either CW or CCW Direction
20—Pressure Head
22—Position Support-Rotation Motion Means
24—Free Atmosphere Space
26—Inlet Port
28—End Cap
30—Hydrostatic Bleed Port (Hole)
32—Space Between Walls (Vanes)
34—Web Tension
36—Wrap Around Roller
38—Hydrostatic Air Film
40—Inside Tube
42—Inside Tube Bleed Ports (Holes)
44—Vane to Tube Clearance Spacing
46—Inner Tube's Outside Surface
48—Inner Tube's Inside Surface
50—Roller Rotation Support Means Support Surface
52—Uncovered Bleed Port Air Flow to Atmosphere

SUMMARY OF INVENTION

The Present Invention consists of a roller guide that controls the position of a thin flexible web with an integral centrifugal pump that provides a Hydrostatic air bearing support cushion between the web and roller outside diameter. This provides for zero friction at all times while the roller is rotating, however viscous friction with air will be present. The required rotation of the Roller can be provided by the flexible web being held and being moved by an external means; or the roller could be driven externally with a separate mechanism such as a motor-belt-pulley system. The air film will tend to dampen tension spikes, however how much damping occurs is a function of the design of the Roller-Air Pump design.

When the Roller-Pump Assembly described herein is being rotated solely by movement of the media from an external means, it will:

1) initially start to rotate,
2) immediately develop a Hydrostatic Air Film which will,
3) start to slip because of the air film, and
4) the roller will start to slow down.

This will reduce the generated air-flow which will tend to increase contact and viscous friction between the media and the roller outer surface. This will increase roller rotation speed again, and what results is a transitional pull-versus-slip condition. Some constant level of slip will be developed and remain there depending upon design parameters. These parameters are things such as tension, speed, wrap angle, internal design of the integrated pump vanes, and so forth.

Figure 1:
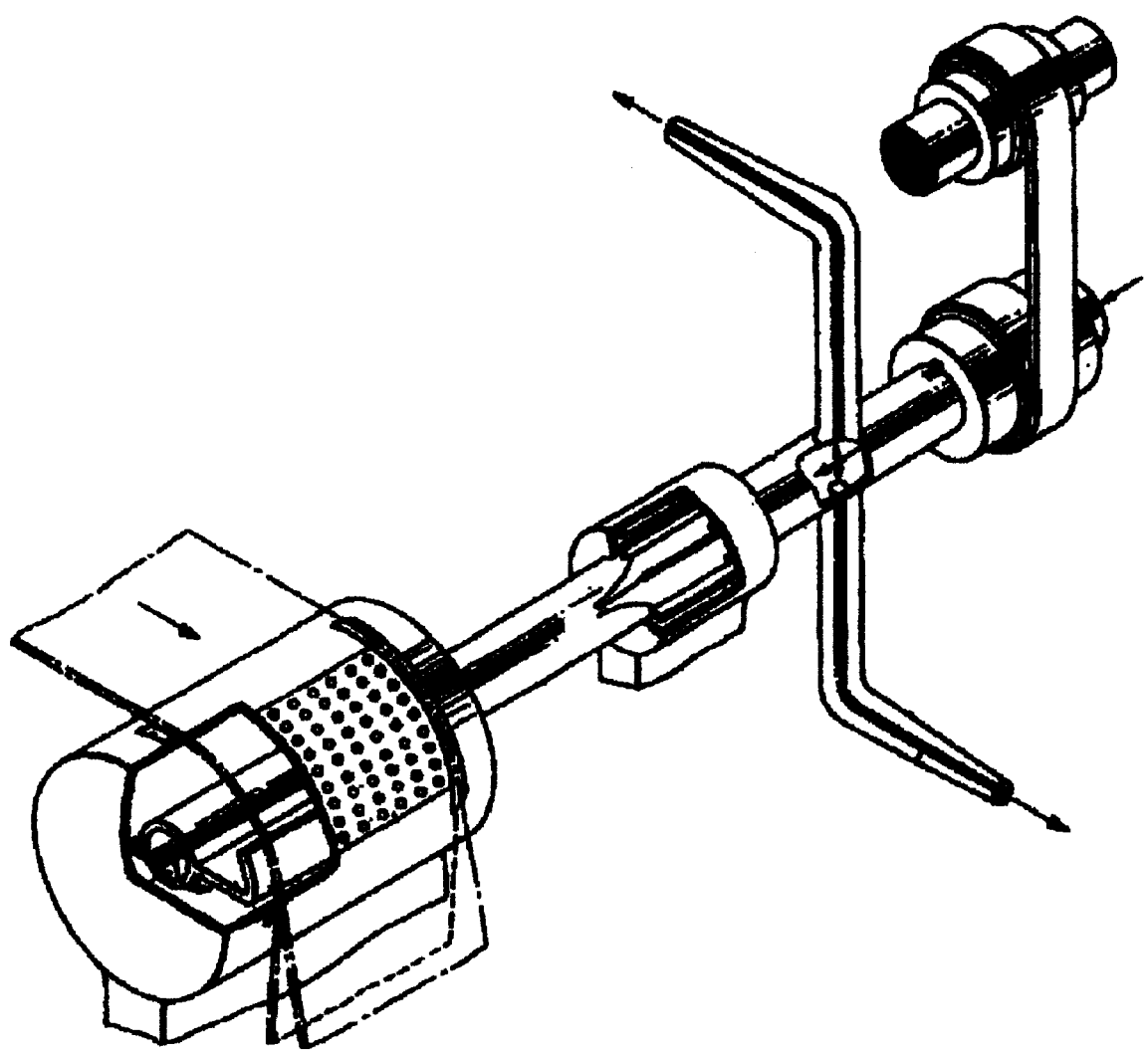
Figure 2:
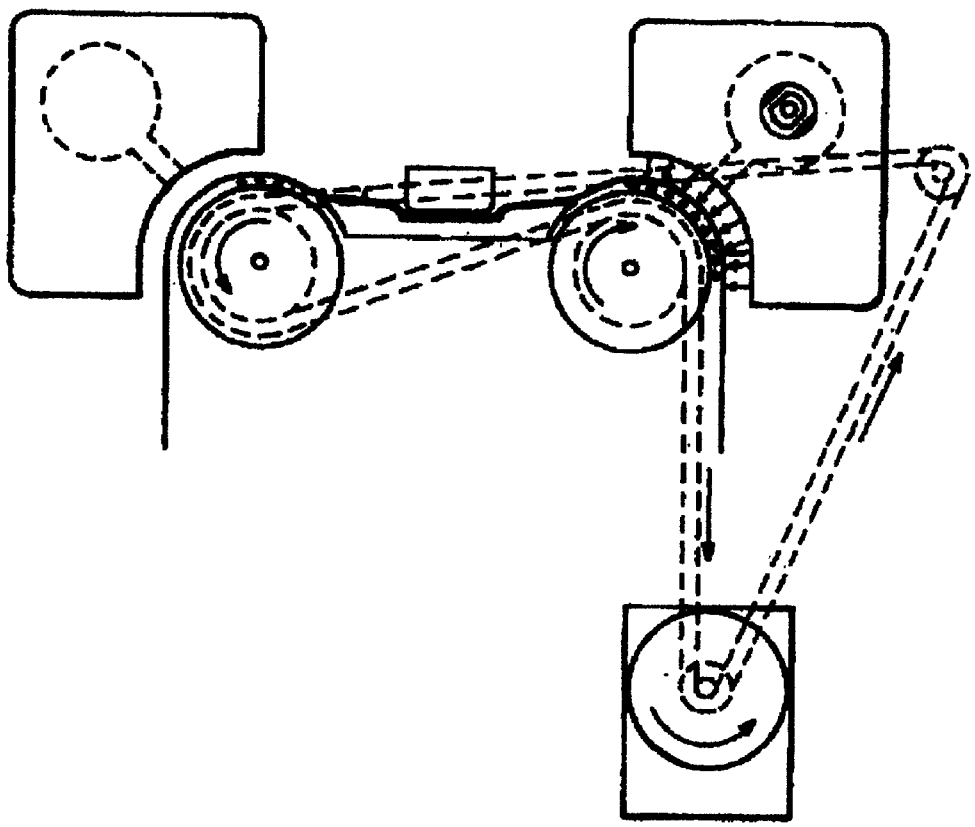
Figure 3:
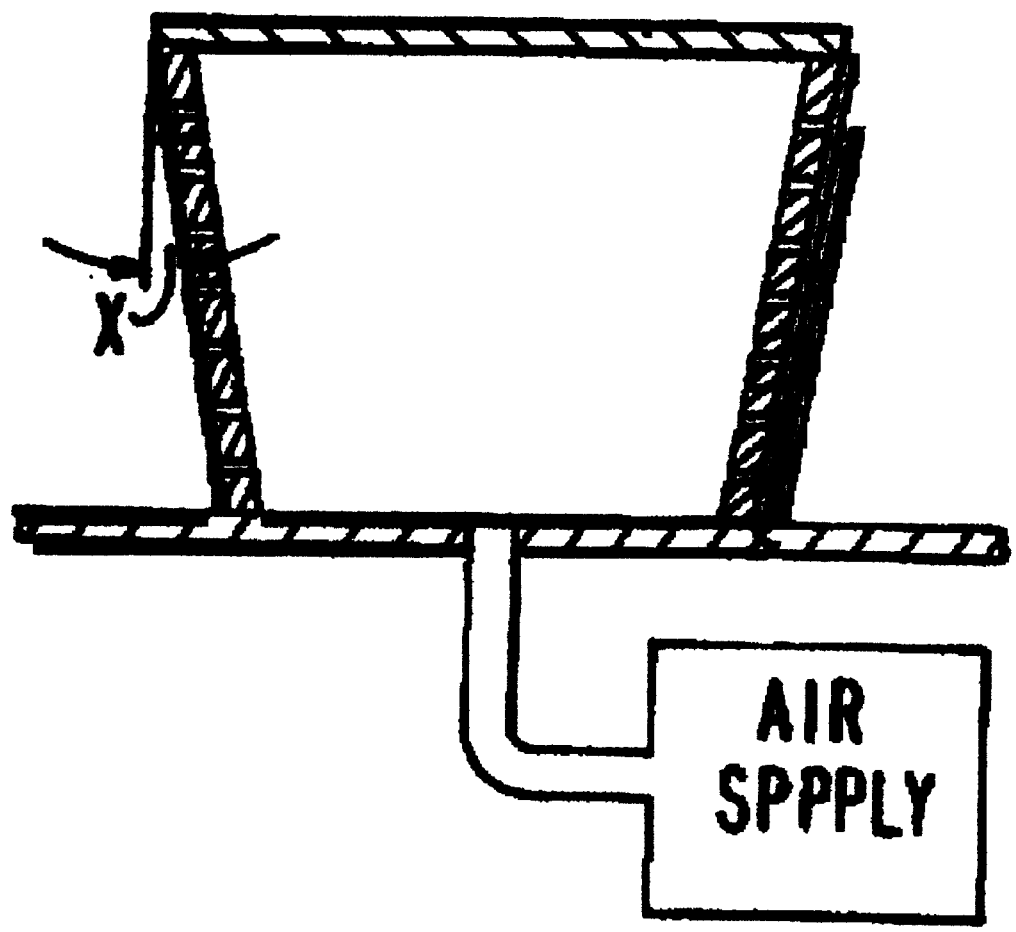

A better application of this invention is to drive the Roller-Pump assemblies either individually or as shown in FIG. 2 PRIOR ART from an external rotation means. The advantages with the Present Invention is the full time development of the Hydrostatic Air Film. Full time guiding of the media is possible with external driving means due to no friction being present, and no tension spikes are generated on Start Operations due to roller inertia.

Either application motion control of the Invention will provide an aircushion that will add damping effects to the flexible web being moved. When accelerating the media sitting on the roller surface (before any motion is introduced), this will cause a tension spike due to the acceleration applied to the rotational inertia of the roller itself. The Roller-Pump Invention is a superior device to add to any small Tape Recorder design. It can provide the mechanical ability to improve tracking capabilities, and increase data capacities for today's tape product arena.

DESCRIPTION—MAIN EMBODIMENT

As shown is FIGS. 10 through 14, a roller outer tube 16 with or without edge flange guide 4 to support and guide a thin flexible web 6. It has one or more internal radially positioned walls 8 that are all aligned with the rotation centerline 10 of the roller outer diameter surface 12 shown in FIG. 11. These walls 8 are attached to the inside diameter surface 14 of the roller outer tube 16 with all pointing inward towards the centerline 10 of the roller 2 itself. When the roller outer tube 16 is rotated 18 about it's centerline of rotation 10, FIG. 12 shows air trapped between these walls 8 (or vanes in this case) will be forced outward due to the principles of Centrifugal Force of a rotating body of any kind. This creates a pressure head 20. The roller has one or two rotation support means 22 (bearings for example as shown in FIG. 13). This allows the roller 2 to rotate freely where the internal walls 8 draw air from a free space 24 located at or near the centerline 10 of the roller's motion 18. In essence this is a centrifugal fan based device.

The size and shape of the cross-section of the walls 8 can be any configuration desired. FIGS. 15A, 15B and 15C show three design approaches. If the rotation is known to be only in one direction 18 then the wall (or vane) could be changed to optimize the air-flow possible by modifying the shape. It is known that shaping centrifugal fan blades in normal fan assemblies can enhance the air movement and pressure head that can be obtained. The preferred embodiment of this Roller-Air Pump patent is shown in FIG. 15A where a symmetrical shape will provide the adequate air flow in either CW or CCW direction 18A.

As shown in FIG. 16, at least one end is partially open to atmosphere. If only one support means 22 is used and sealed, then the open end shall be capped with End Cap 28 at it's outer section to prevent end leakage of air from the centrifugal pump effects. An end-cap 28 is needed to build pressure inside the outer tube, but still allow air to enter near the centerline of rotation through Inlet Port 26. It would have to provide at least one inlet port 26 to atmosphere 24 where air would freely enter the inside of the roller assembly. As shown in FIG. 18 if a two position rotation support means 22 are used on both ends of the roller outer tube 16 then at least one must be open to atmosphere 24 to allow the free movement of air into the centrifugal pump insides.

Referring to FIG. 11 and 12 numerous Hydrostatic bleed ports 30 (holes) are provided on the roller's outside surface 12 leading back inside to the spaces between the centrifugal pump walls 32. This completes a path for free air to enter (with some mechanical urging) at one or both ends of the roller assembly near the assembly's centerline of rotation 10. Referring to FIG. 17 the air then moves into the centrifugal pump interior air spaces 32 between the assembly's internally located walls fixed to the outer surface 14. And with the urging by the creation of centrifugal forces, acting on the trapped air with forced rotation 18 of the outer tube 16, it then creates a pressure head 20 on the Hydrostatic ports 30. This pressure head 20 forces the air through the Hydrostatic ports 30 which lead to the outer surface 12 designed to support the flexible web 6 shown in FIG. 10. When a flexible web 6 (such as magnetic media) is held with physical tension 34 provided elsewhere in the machine, an air bearing pressure support film 38 is generated as seen in FIG. 19. What is developed herein is a roller assembly with an integral air pump to generate an air bearing functional guide. FIG. 19 shows Uncovered Bleed Port leakage 52 when these ports are not covered by media under tension.

Detailed design attributes that must be considered are:
1) wrap-angle 36 shown in FIG. 19 of media 6 around roller 2,
2) number and size of Hydrostatic ports 30 shown if FIG. 16 to be covered by media 6 shown if FIG. 12 at any one time,
3) rotational speed 18 shown if FIG. 12 to generate desired pressure head 20,
4) the number of walls 8 shown in FIG. 11 inside the roller 16, and
5) insure a internal volume defined by 32 (Space Between Walls) and it's dedicated Bleed Parts 30 are not larger in outer circumference area than the wrap angle 36 to minimize the Uncovered Leakage 52.

Some significant development engineering will be required depending upon the tape product's performance goals in order to produce a working Roller-Air Pump design to be used in a specific tape product. However the fundamental principles utilized by the Present Invention are sound and a working Roller with an Integrated Pump can be designed successfully for any Magnetic Tape Recorder Product.

OPERATION—MAIN EMBODIMENT

The roller assembly is rotated about it's centerline with an external driving means. One such external method is a linearly traveling thin shell flexible web 6 shown in FIG. 10 that is wrapped with tension 34 onto the roller 2 with some wrap angle 36 shown in FIG. 19 to hold it in place. When the web 6 moves due to a external reel-to-reel driving system (not covered here) then the roller assembly will rotate 18 as shown in FIG. 17 with ease. Or, it could be driven externally by some gear-belt-motor system at a steady rotation speed independent of whether a web is present, or not. Or each Roller-Air Pump could be externally driven individually. FIG. 2 PRIOR ART shows a system to drive the Roller-Pump Assemblies as desired.

Figure 4:
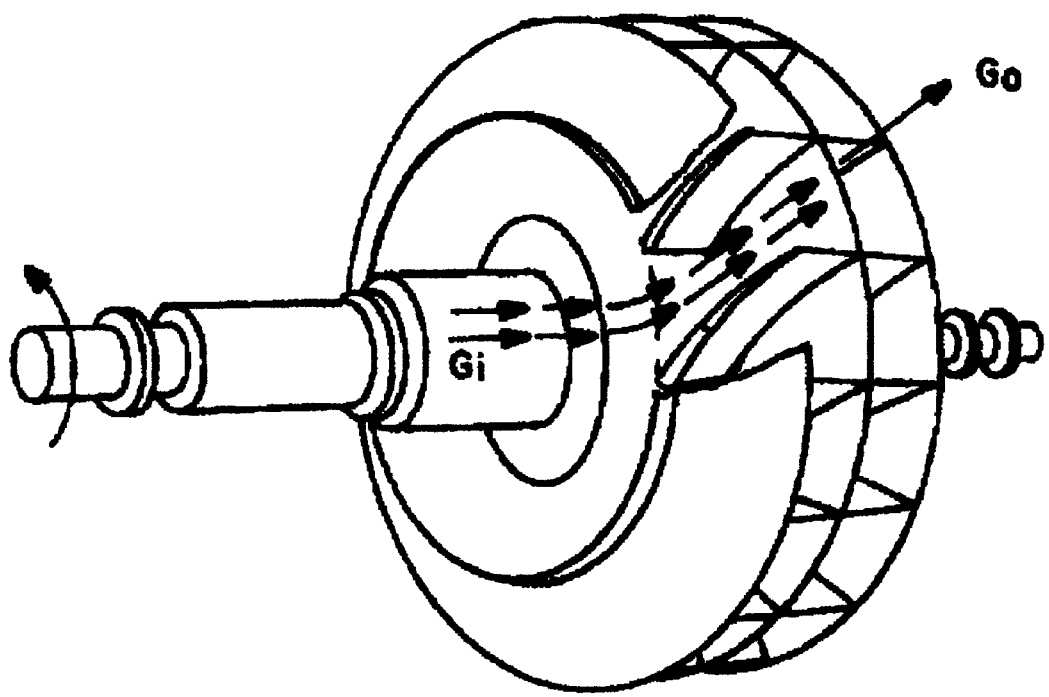
Figure 5:
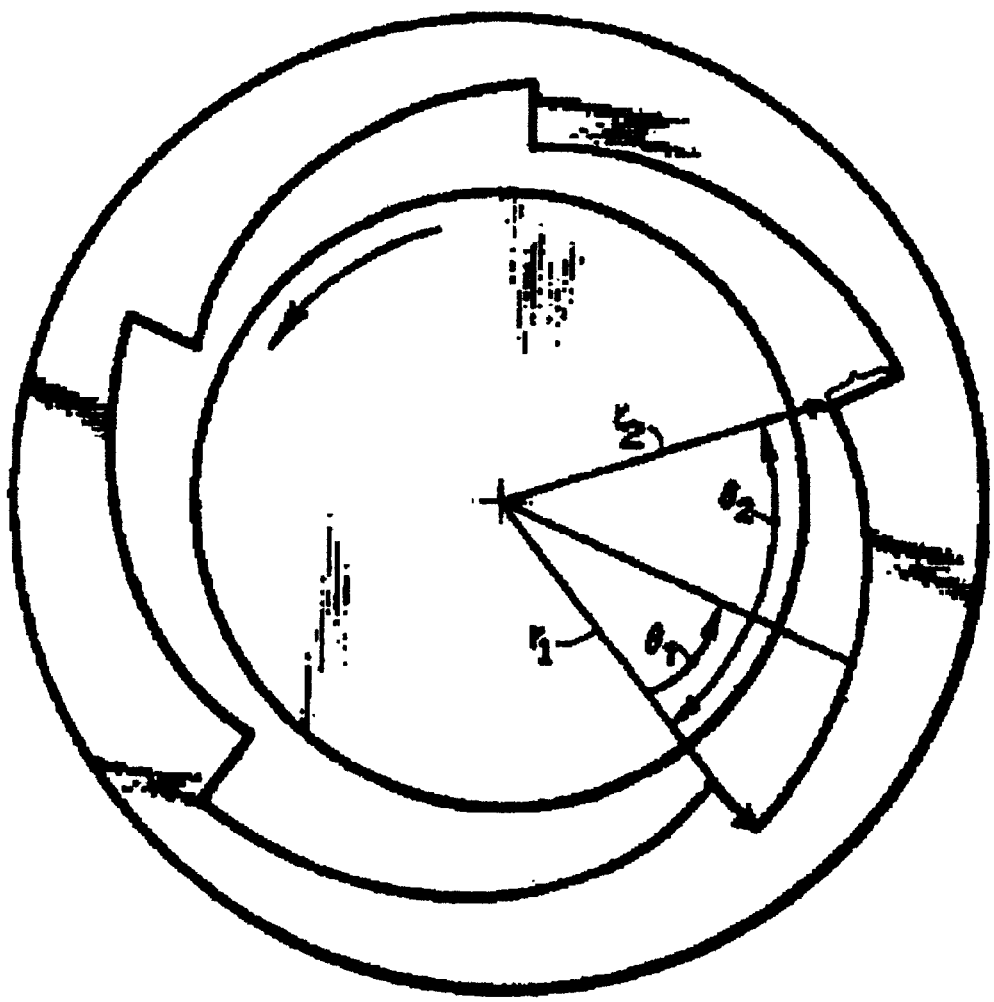

As shown in FIG. 17 this rotation 18 of the roller 2 pumps air from outside atmosphere 24 to the space 32 near the roller's centerline 10, through the Hydrostatic bleed holes 30 on the roller's outside diameter surface 12 utilizing the known physical Principle of Centrifugal Force. FIG. 4 PRIOR ART shows a working Centrifugal Fan Assembly where vanes turning about an axis force air to flow outwards due to this principle. The air trapped between the walls 8 (vanes) will be forced to rotate at some angular velocity thus creating centrifugal forces acting upon the air itself. This action develops a pressure head 20 at the inside surface 14 of the roller's outside shell 16. This pressure will push air through the Outer Tube's Hydrostatic ports 30. As seen in FIG. 19 again if a flexible web 6 is held by other means (tension 34) down against the roller's outer surface then a Hydrostatic air film 38 will develop to support the web. This air film 38 will provide a frictionless air-bearing surface on a roller guide assembly. An end-cap 28 must block a portion of the end of the roller outer tube 16 so pressure 20 can be built up with rotation 18 of the Roller-Air Pump. The function of the End Cap 28 (shown in FIG. 16) can also be provided by a second Rotation Support Means (ie bearing) 22 shown in FIG. 18.

DESCRIPTION AND OPERATION—ALTERNATIVE EMBODIMENTS

To better control eddy type pressure losses, and leakage of air flow at the entry to the centrifugal pump vanes 8 (shown in FIG. 14), an Inside Tube 40 with numerous and large bleed holes 42 can be added. FIG. 18 shows this configuration which would require two bearings. Referring to FIG. 14 the spacing 44 from this inside tube's outside diameter surface 46 and the centrifugal vane's 8 closest inside edge clearance 44 shall be controlled to be small enough dimensionally to insure an efficient movement of air from the atmosphere 24. As air flows into this tube's inner space 48, out through it's large bleed ports 42, into the space 32 between the centrifugal pump vanes, and lastly out the Hydrostatic air ports 30 of the roller's outside surface 12. The air is forced to pass through this path from the centrifugal force pressure head 20 that is created when the assembly is rotated externally. This internal wall-to-tube clearance space 44 is controlled so no physical (only air) contact occurs between the inner tube outside surface 46 and the vanes 8 inside edges. Referring to FIG. 18 either end, or both, may help engage a rotation support means 22 (bearing for example) for the roller assembly to operate. Ball bearings used as rotational means for the roller assembly to operate and generate the pressure head 20 could be added to both sides of the Inner Tube 40 but would not impact the operation of the centrifugal pump system described herein. At least one bearing would have to position the Inner Tube 40 so it's volumetric insides are accessible to atmosphere. The opening required for air to enter would have to be integrated with at least one bearing.

The roller outside diameter surface 12 may have one or two circumferentially vertical wall flanges 4 shown if FIG. 10 to aid in guiding a flexible web 6 as desired. These flanges 4 would be fixed, or not fixed, to the outer rotating surface 12. However, it is most common to have these flanges be fixed to the outside rotating surface 12 of the roller assembly. The air bearing beneficial effects generated by this invention would not be impacted at all with the addition of the mentioned vertical flanges on either side of the roller's outside rotating surface.

If desired the entire function of an expensive (generally unreliable by today's standards) pneumatic air supply system can be substituted into any roller based magnetic tape recorder by rotating the Present Invention Roller-Air Pump Guides externally. Any means that would provide the rotation required to generate the pressure head inside each individual roller in the path would work. Any kind of belt-gear-motor means that would drive all of the roller assemblies, or drive a roller assembly individually would provide the air bearing media support for the product being developed. Savings are incurred because no air-lines, fittings, filters, noise suppression parts, are used. Better reliability over the pneumatic air systems that could be incorporated is obtained with this invention. The Centrifugal Pump described here is more reliable than the classic pressure pump and motor assembly used in older tape units of the past. With the web supported full-time on the Roller-Air Pump Hydrostatic air film when stopped, it will completely eliminate any tension spikes upon starting due to effects of roller rotational inertia. Providing air bearing supported tape path for very small Form Factor Tape Products provides a significant marketing advantage over any other drive on the market today (1999–2000).

The performance advantages of air bearings in tape path design is possible through utilizing this patent. By utilizing this Roller-Air Pump patent it is possible for:

1) very small Form Factor physical space (which is the current trend in Magnetic Tape Unit development),
2) lower tape path friction for better tension control and power consumption,
3) lower path inertia caused tension spikes,
4) better guiding possibilities, and
5) less media physical surface contact with path components (rollers).

The most significant by-product improvement possible in small Form Factor tape units that is possible with this patent is the following. Increases in Track Densities across the width of the media, when rollers are used in the tape path, are very much controlled by the non-repeatable runout of the bearings used to mount and rotate the rollers themselves. This runout is a very large portion of any reliable Track Budget Analysis that would be done to estimate how dense of tracks can be written and reliably read back on a magnetic media data recorder. The other large contributor is the slitting width tolerance control the media producer can maintain in cutting media for tape cartridges or reels. The flange spacing on the rollers must be line-to-line or slightly larger than the maximum width of the media. Then when media cut to the low end of the width tolerances it will slide freely, side-to-side, while running on the roller. Pinching media to any extent will permanently damage the edges and quite possibly recorded data would be lost. Thus the media width tolerance also contributes to the lower than desired Track Density goal of the tape product. Efforts have been made in the industry to attempt to push on one edge of the media while it is held in position by the roller. Because of the friction that resides in a normal roller setup, larger than desired edge forces must be used to move the media against the reference guide flange surface. It can very easily damage the media when overcoming the variable media to roller surface frictional forces. No successful roller edge force design exists today on products being shipping to customers.

However, Hydrostatic and Hydrodynamic air bearings had been used in earlier, large vacuum column tape units in the guiding of media within a tape path. The air film generated provides zero frictional force to overcome and only a non-damaging, very small edge force carefully applied to the media edge does the job of adequately guiding the media within the tape path along the reference surface chosen. This can be provided either by providing spring loaded leaf spring loaded guide pads on one side of the roller, or provide a taper on the outside surface of the guide working surface to bias the media to the flange selected to do the guiding. Either of these designs can be incorporated into a working model of the Roller-Air Pump Assembly described in this Specification.

Hydrodynamic air bearing guides, while generating their own air film with media motion, are very susceptible to 'stiction' when stopped. They also cannot function well on tape motion starts with large wrap angles. Because of this trait large, older vacuum column based drives had very little wrap on these Hydrodynamic guides. They have not found a home in small media cartridge drives without manufacturing problems. Very small diameter pins inside tape cartridge are difficult to hold square and they are in effect Hydrodynamic guides with very small working radii. Contact and stiction easily occur here.

CONCLUSION, RAMIFICATIONS AND SCOPE

The concept of combining the advantages of rollers and air bearings without the inherent disadvantages (already discussed) that can be incorporated into any form of magnetic tape recorder is very valuable. The device described here can be incorporated into small Form Factor tape unit designs. It can be incorporated directly into tape cartridges themselves with external rotational motion provided by the unit that receives the tape cartridge. The improved guiding provided by the tapered roller surface will open up a new, measurable improvement in track densities, and it is only possible due to the Roller-Air Pump combined function provided by this patent. At present the non-repeatable dimensional runout of the very best ball bearings used in rollers is limiting the TPI possible, along with media width tolerances.

Also today's tape product developers have increased the linear recording densities to high enough levels (greater than 100K Flux Reversals per Inch) where now sonic waves generated. At the start of motion these waves will rattle around, reflect from roller to roller and then back across the Read-Write Sensor, and result in data write and read detection timing problems. These are giving today's Channel designer trouble and this is a new issue for them to handle. This patent will make possible a significant increase in media cartridge and reel data capacities on today's small tape products.

What is claimed is:

1. A thin flexible web Roller Support Device comprising, an Outer Tube, a Rotational Position Support Means, and an Inlet Airflow Means;

wherein, said Outer Tube having at least one Radially Mounted Wall fixed to said Outer Tube inside surface running parallel to the center-line of said Outer Tube, multiple Hydrostatic Ports leading from Centrifugal Pump Spaces between said at least one Radially Mounted Wall through said Hydrostatic Ports to the outside support surface of said Outer Tube, and sufficient space near the center-line of rotation of said Outer Tube for air to flow freely into said Centrifugal Pump Spaces, and said Rotation Position Support Means attached to said Outer Tube wherein said Outer Tube is free to rotate about said Outer Tube centerline, and said Inlet Airflow Means located on at least one end of said Outer Tube and said Rotation Position Support Means combination to complete a Centrifugal Air Pump gas flow path, whereas, when said Outer Tube rotates in free Air space, said Air will be pumped from outside said Outer Tube through said Inlet Airflow Means, through said Hydrostatic Spaces, and through said Hydrostatic Ports providing a Hydrostatic Air Film source to said Outer Tube surface.

* * * * *